(12) United States Patent
Rose

(10) Patent No.: US 8,376,211 B2
(45) Date of Patent: Feb. 19, 2013

(54) TURBINE ELEMENT REPAIR FIXTURE

(75) Inventor: William M. Rose, Warren, MA (US)

(73) Assignee: United Technologies Corporation, Hartford, CT (US)

( * ) Notice: Subject to any disclaimer, the term of this patent is extended or adjusted under 35 U.S.C. 154(b) by 237 days.

(21) Appl. No.: 12/563,546

(22) Filed: Sep. 21, 2009

(65) Prior Publication Data

US 2010/0005637 A1    Jan. 14, 2010

Related U.S. Application Data

(62) Division of application No. 11/326,929, filed on Jan. 6, 2006, now abandoned.

(51) Int. Cl.
*B23K 5/22* (2006.01)
*B23P 6/00* (2006.01)

(52) U.S. Cl. .................. 228/212; 29/23.51; 29/889.1

(58) Field of Classification Search .......... 228/212; 29/889.1, 23.51
See application file for complete search history.

(56) References Cited

U.S. PATENT DOCUMENTS

| | | | |
|---|---|---|---|
| 2,907,233 A * | 10/1959 | Broffitt | 408/12 |
| 3,132,617 A | 5/1964 | Miller et al. | |
| 4,128,929 A | 12/1978 | DeMusis | |
| 5,319,179 A | 6/1994 | Joecks et al. | |
| 5,554,837 A | 9/1996 | Goodwater et al. | |
| 5,935,718 A | 8/1999 | Demo et al. | |
| 6,333,484 B1 | 12/2001 | Foster et al. | |
| 6,742,698 B2 | 6/2004 | Shah et al. | |
| 6,820,468 B2 | 11/2004 | Powers et al. | |
| 2002/0136637 A1 | 9/2002 | Powers et al. | |
| 2005/0061858 A1 | 3/2005 | Ditzel et al. | |
| 2005/0091846 A1 | 5/2005 | Powers et al. | |

FOREIGN PATENT DOCUMENTS

| | | |
|---|---|---|
| EP | 1221604 A2 | 7/2002 |
| EP | 1403002 A2 | 3/2004 |
| EP | 1422402 A1 | 5/2004 |
| JP | 04-343001 A | 11/1992 |
| JP | 10-180442 A | 7/1998 |
| JP | 2002-254187 A | 9/2002 |
| JP | 2003-533354 A | 11/2003 |

OTHER PUBLICATIONS

Machine Translation of JP 10-180442 which originally published Jul. 1998.*
Japanese Office Action for JP2006-340702, dated May 26, 2009.
EP Search Report for EP Patent Application No. 07250013.5, dated Aug. 5, 2010.

* cited by examiner

*Primary Examiner* — Keith Walker
*Assistant Examiner* — Nicholas D'Aniello
(74) *Attorney, Agent, or Firm* — Bachman & LaPointe, P.C.

(57) ABSTRACT

A blade processing fixture has first and second jaws. The second jaw is movable relative to the first jaw from a disengaged position for accepting a root of the blade. The blade is accepted in a receiving area between the first and second jaws. The second jaw is movable to an engaged position clamping the blade between the first and second jaws. A gas flow path extends from an inlet port to an outlet port. The outlet port is positioned to introduce gas to a blade inlet port when the blade is installed.

14 Claims, 5 Drawing Sheets

TURBINE ELEMENT REPAIR FIXTURE

CROSS-REFERENCE TO RELATED APPLICATION

This is a divisional application of Ser. No. 11/326,929, filed Jan. 6, 2006 now abandoned, and entitled Turbine Element Repair Fixture, now abandoned, the disclosure of which is incorporated by reference herein in its entirety as if set forth at length.

BACKGROUND OF THE INVENTION

The invention relates to repair of turbine engine components. More particularly, the invention relates to fixtures for repairing turbine engine blades.

Turbine engine blades (including fan, compressor, and turbine section blades) are subject to wear and damage (e.g., foreign object damage (FOD)). Repair of such damage may include coating removal, machining of a wear/damage site, and/or the attachment of a scaffold material. The scaffold material may be externally attached, inserted, or in situ formed. The scaffold surface may define an external or internal surface of repair material built-up atop the scaffold. Exemplary build-up may be by welding (including laser cladding), brazing, or deposition. During repair, the blade may be held in a fixture. An exemplary fixture is a vise-like structure having drawers configured to grasp pressure and suction side surfaces of the blade airfoil.

SUMMARY OF THE INVENTION

One aspect of the invention involves a fixture for processing a blade. The fixture has first and second jaws. The second jaw is movable relative to the first jaw from a disengaged position for accepting a root of the blade. The blade is accepted in a receiving area between the first and second jaws. The second jaw is movable to an engaged position clamping the blade between the first and second jaws. A gas flow path extends from an inlet port to an outlet port. The outlet port is positioned to introduce gas to a blade inlet port when the blade is installed. In various implementations, at least one of the jaws may be removable and replaceable with a structurally different jaw to permit the fixture to accommodate a structurally different blade. The fixture may be used in a build-up repair on the blade. During the repair, a suitably non-reactive gas may be introduced through the fixture to limit or avoid adverse reaction (e.g., oxidation) of a scaffold element, the blade parent material, and/or the deposition material.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
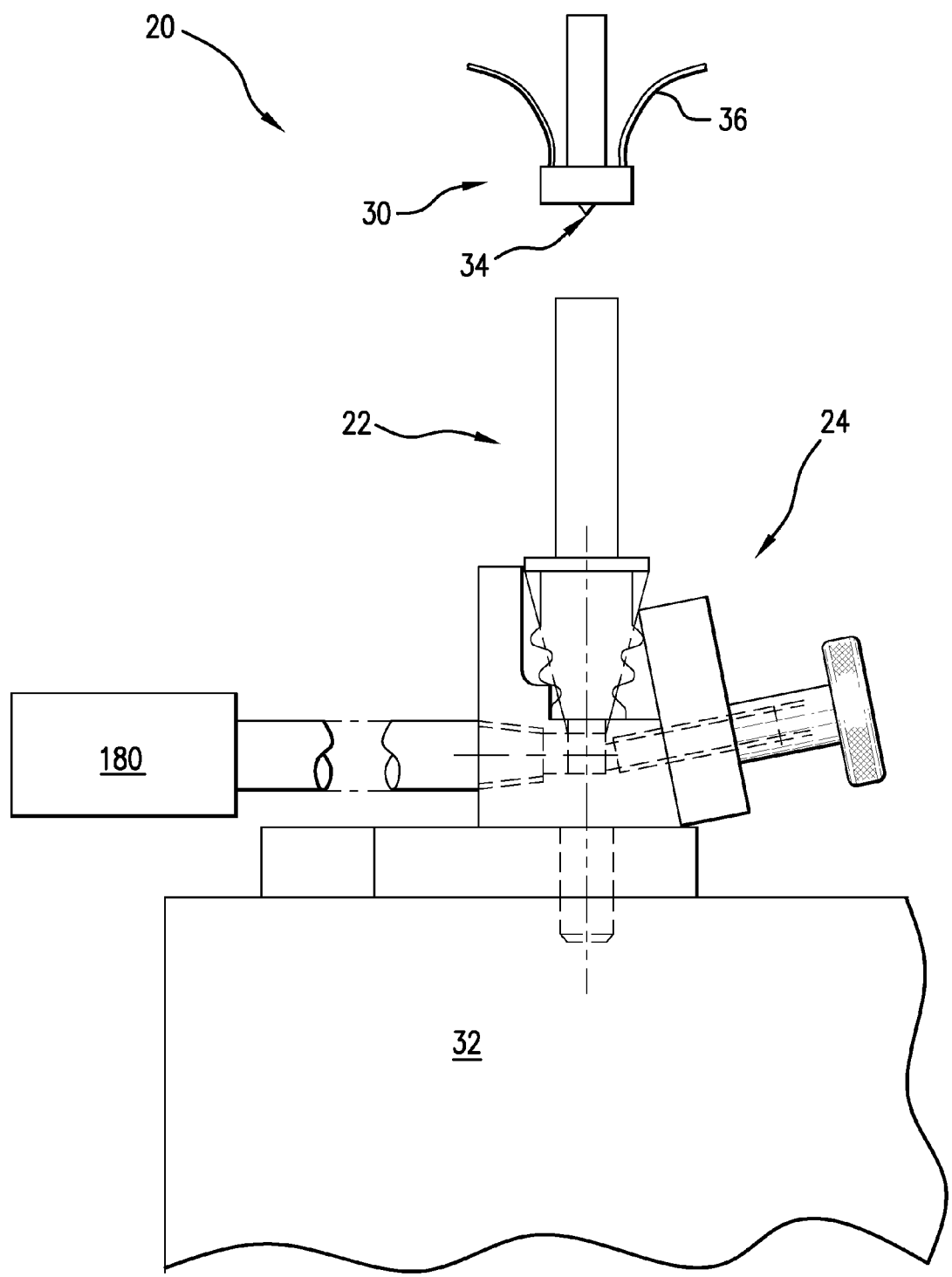
FIG. 1 is a view of a blade processing station.

FIG. 1 shows a station 20 for processing (e.g., repair) of a turbine element 22 (e.g., a gas turbine engine compressor or turbine section blade). The blade 22 is held by a fixture 24.

An exemplary processing of the blade involves adding material (e.g., a build-up of material in a repair or restoration process). The processing may also or alternatively include removing material (e.g., preparatory or finish machining). An exemplary build-up of material may be by a welding process such as laser cladding. Accordingly, to apply the material, the station 20 may include a welding head 30. To position the head 30 relative to the blade 22, one or both of the head 30 and fixture 24 may be movable. For example, the fixture 24 may be mounted to an automatically controlled reference such as a five-axis rotary table 32. An exemplary head is a laser cladding head having a nozzle 34 and metal powder feed lines 36.

Figure 2:
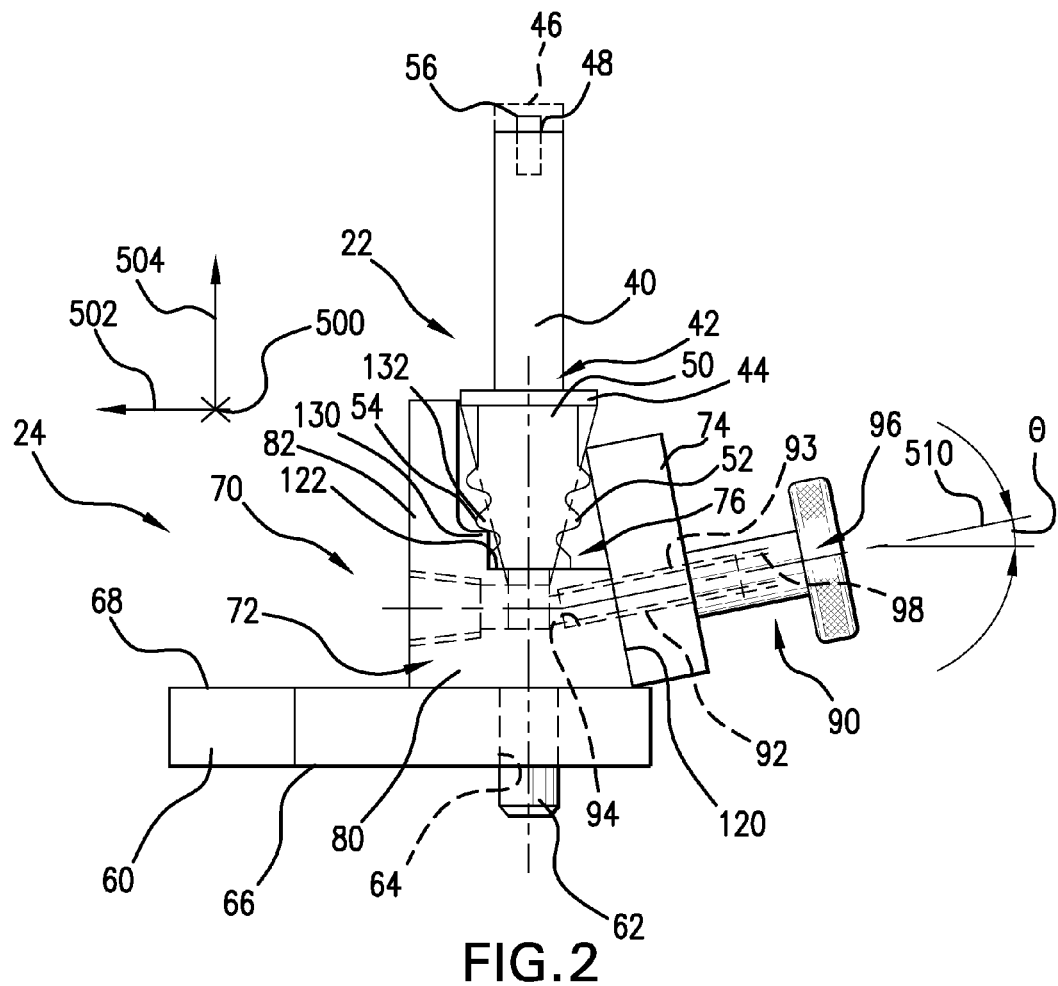
FIG. 2 is a side view of a fixture from the station of FIG. 1.

FIG. 2 shows further details of an exemplary blade 22 and fixture 24. The blade has an airfoil 40. The airfoil 40 extends from an inboard end 42 at a platform 44 to an outboard tip 46. In an exemplary repair situation, the tip may have been damaged and the blade is shown having been machined along a surface 48. A convoluted fir-tree attachment root 50 depends from an underside of the platform 44. The root 50 has first and second longitudinal ends and first and second circumferential sides 52 and 54. For reference, "longitudinal", "circumferential", and "radial" directions 500, 502, and 504 defined relative to the orientation that the blade assumes when the root 50 is installed in a complementary slot in a disk of a turbine engine. A scaffold element 56 has a first portion extending into a passageway or compartment in the airfoil below the surface 48. The scaffold 56 has a second portion protruding from the surface 48 for re-forming an end portion of the passageway or compartment when a deposition material is applied atop the surface 48 and scaffold 56. An exemplary scaffold is a refractory metal-based (e.g., molybdenum) core element.

The exemplary fixture 24 includes a base 60 for mounting the fixture to the table 32. An exemplary base 60 is formed as a metal plate (e.g., of an aluminum alloy or steel). In the exemplary base 60, a pair of metal (e.g., steel) dowel pins 62 (FIG. 3) have upper portions press fit into associated apertures 64 in the base and have lower portions protruding below an underside 66 of the base. The pins 62 may be received by complementary holes or slots in the table to register the fixture relative to the table. The fixture may be secured to the table by means such as clamps (not shown).

The upper surface 68 of the exemplary base 60 carries a root-engaging clamp structure 70. The exemplary clamp structure 70 (FIG. 2) includes a fixed jaw 72 and a movable jaw 74. The fixed and movable jaws 72 and 74 cooperate to define a channel-like receiving area 76 for receiving the blade root 50.

Figure 4:
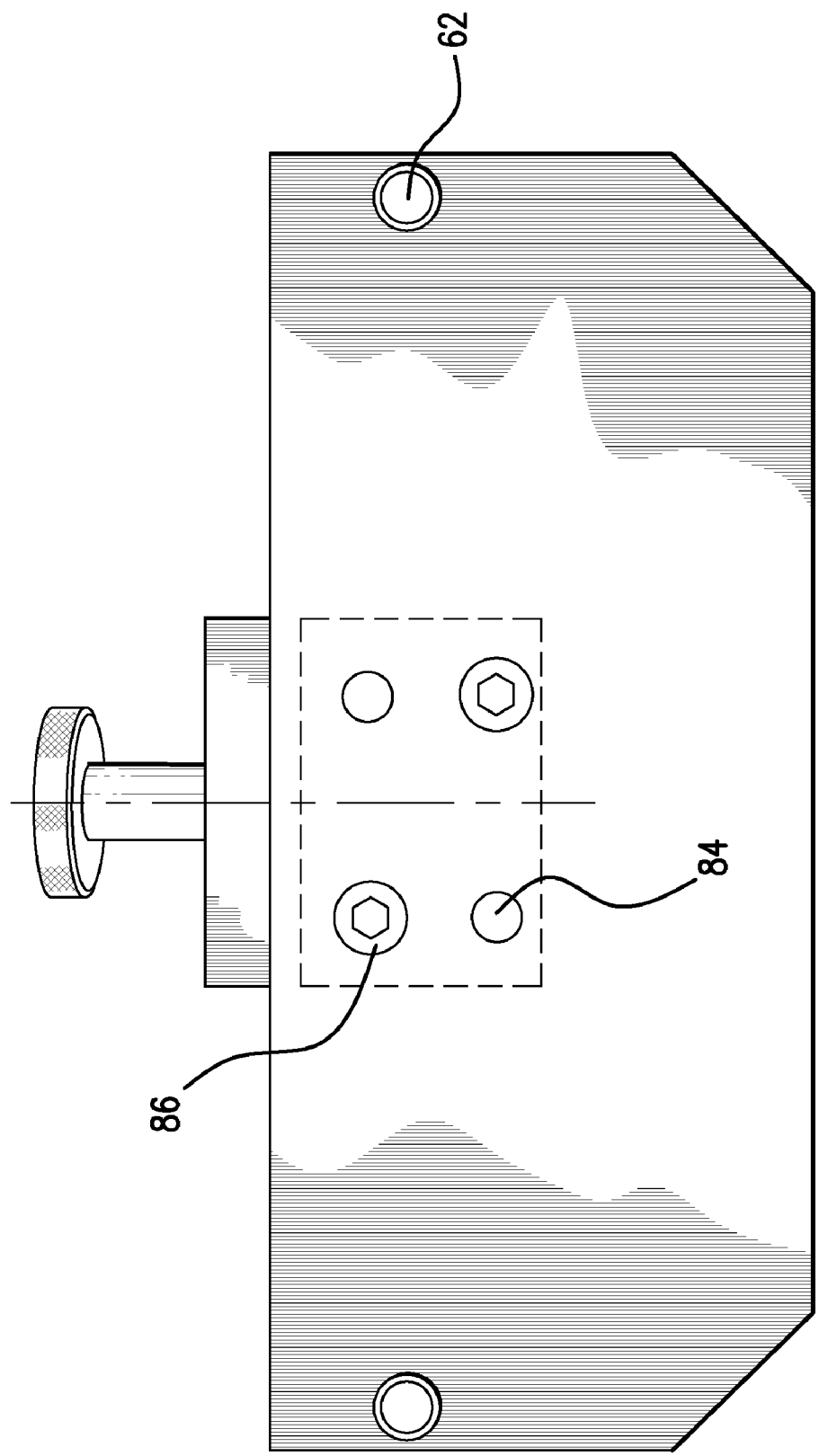
FIG. 4 is a bottom view of the fixture of FIG. 2.

The exemplary fixed jaw 72 includes the unitary combination of a bottom portion 80 along the base 60 and a wall portion 82 opposite the moving jaw 74 and extending away from the base 60. The exemplary fixed jaw is mounted to the base by means of registering pins 84 and screws 86 (FIG. 4).

A screw or other means are provided for tightening the moving jaw 74. An exemplary screw assembly 90 includes a threaded shaft 92 passing through a bore 93 in the jaw 74 and into threaded engagement with a bore 94 of the fixed jaw 72. The exemplary screw 90 further includes an actuator 96 (e.g., a knob). The exemplary knob 96 has a bore 98 receiving an outboard portion of the screw. Tightening/loosening of the knob 96 may do one or both of tightening/loosening of the shaft relative to the knob or the shaft relative to the screw fixed jaw to shift the moving jaw 74 toward/away from an engaged condition.

The exemplary screw assembly 90 has a central axis of rotation 510 at an angle θ off-parallel to the base underside 66. Exemplary θ is 5-30°. With the radial direction 504 essentially normal to the underside 66, the axis 510 is off-normal to the radial direction by θ. The exemplary bottom portion 80 has a front face 120 oriented normal to the axis 510. The fixed jaw bottom portion 80 has a generally horizontal upper surface 122. With the blade installed and the jaws in the engaged condition, an underside 124 of the root contacts the bottom portion upper surface 122. A shoulder 130 of the fixed jaw wall portion 82 engages an associated neck region 132 of the adjacent side of the root. An upper rear edge portion 140 of the moving jaw 74 engages a neck portion 142 of its adjacent side of the root. The off horizontal angle of the axis 510 helps cause the moving jaw 74 to exert a downward force to the blade root, clamping the blade root both against the fixed jaw wall portion 82 and bottom portion 80.

Figure 3:
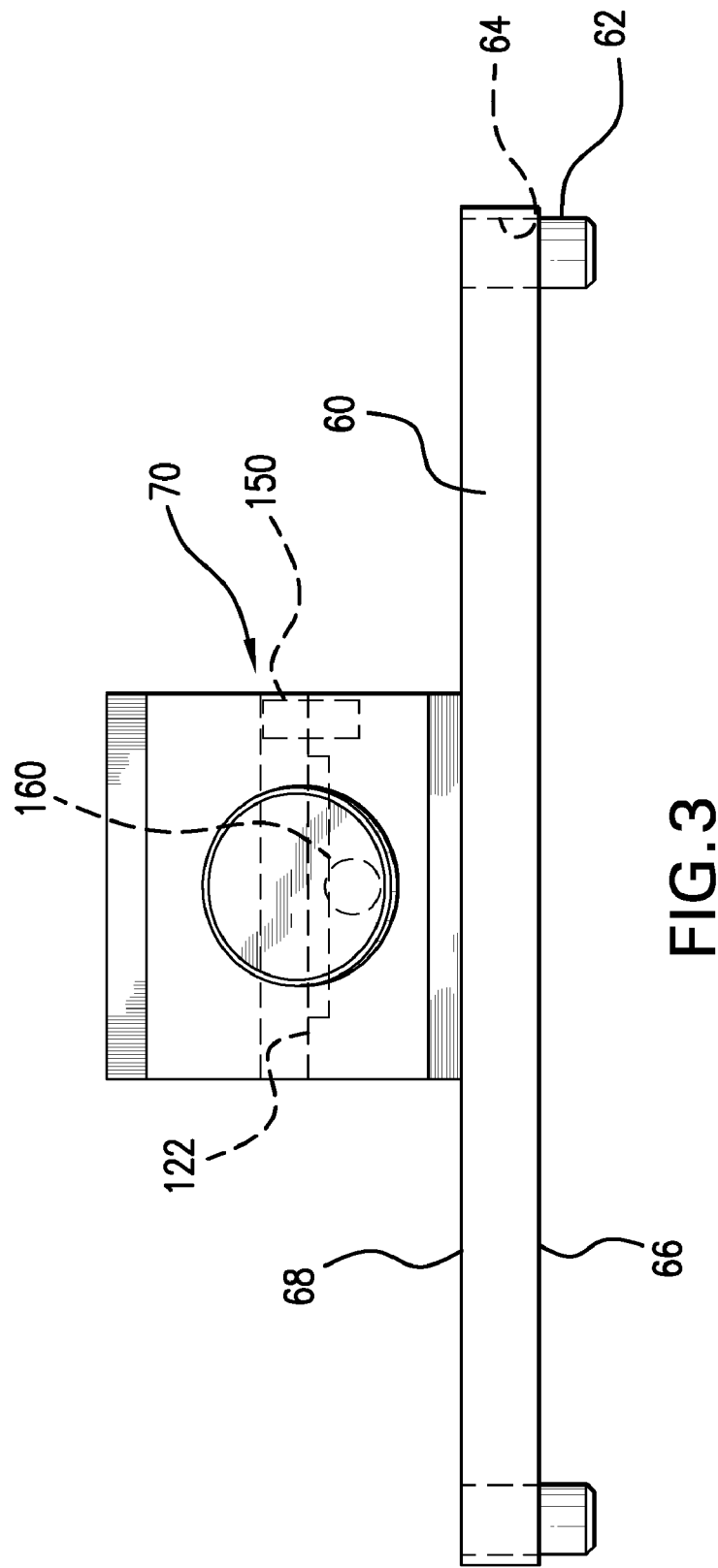
FIG. 3 is a front view of the fixture of FIG. 2.
Figure 5:
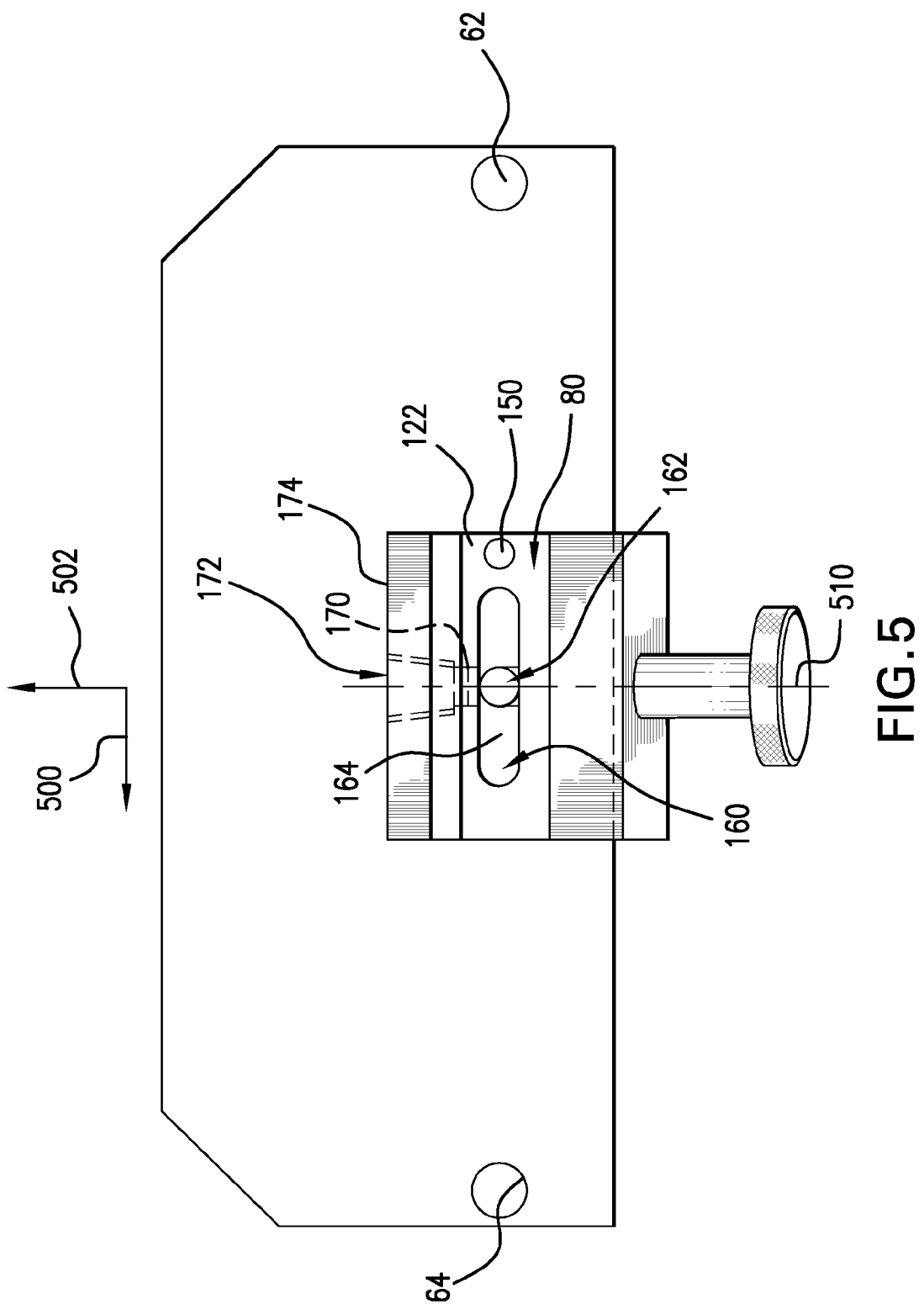
FIG. 5 is a top view of the fixture of FIG. 2.
Like reference numbers and designations in the various drawings indicate like elements.

The exemplary fixture includes additional means for precisely registering the blade relative to the fixture. Exemplary registering means include a projection at least partially captured in an aperture of the blade. In the illustrated embodiment, the projection is formed by the upper end of a pin 150 (FIGS. 3 and 5). The exemplary pin 150 (e.g., steel) has a pin upper portion protruding from the fixed jaw bottom portion 80 upper surface 122 and a pin lower portion received in press-fit relation in an associated bore in the fixed jaw bottom portion 80.

A channel 160 (FIG. 5) is formed in the fixed jaw bottom portion upper surface 122. The exemplary channel 160 extends elongate in the blade longitudinal direction 500 (i.e., transverse also to the axis 510). The exemplary channel 160 is obround and may be formed by milling. A bored port 162 extends downward from a base 164 of the channel. The port meets a transverse bore 170 (e.g., extending approximately in the blade circumferential direction 502) from an inlet port 172 on the backside 174 of the fixed jaw. The bore 170 may include pipe threads for engaging a fitting (not shown) to couple the fixture to a source 180 (FIG. 1) of inert gas (e.g., argon or other noble gas or a gas essentially non-reactive in the welding process). For example, otherwise desirable materials for scaffold elements may be subject to oxidation or other chemical degradation. These may include refractory metal-based cores for forming/reforming internal passageways. The gas may be effective to limit such degradation to a tolerable amount or essentially eliminate it.

One or more embodiments of the present invention have been described. Nevertheless, it will be understood that various modifications may be made without departing from the spirit and scope of the invention. For example, details of the particular turbine elements to be worked upon and details of the work station may influence details of any particular implementation. Accordingly, other embodiments are within the scope of the following claims.

What is claimed is:

1. A method for processing a turbine engine blade comprising:
    placing a root of the blade in a receiving area of a fixture, the fixture comprising:
    a first jaw, being a fixed jaw;
    a second jaw, movable relative to the first jaw from a disengaged position for accepting a root of the blade in a receiving area between the first and second jaws to an engaged position clamping the blade in said receiving area between the first and second jaws, the first jaw comprising a bottom portion along a base and a wall portion extending away from the base and opposite the second jaw; and
    a gas flow path from an inlet port to an outlet port, the outlet port positioned to introduce gas to a blade inlet port when the blade is installed,
    tightening the second jaw against the root, the tightening causing the second jaw to exert a downward force to the blade root, clamping the blade root against the wall portion of the first jaw and the bottom portion of the first jaw, the first jaw remaining fixed during the tightening;
    delivering a gas through the fixture and the blade through a port in the root; and
    adding material to a site on the blade.

2. The method of claim 1 wherein:
during at least a portion of the adding, the gas exits through at least a first outlet at the site.

3. The method of claim 2 wherein:
the adding closes the first outlet.

4. The method of claim 2 wherein:
the tightening comprises rotating an actuation member about an axis, said axis being off normal to a central radial plane of the root by 5-30°.

5. The method of claim 1 further comprising:
mounting the fixture to an automated table.

6. The method of claim 1 wherein:
the adding comprises welding.

7. The method of claim 1 wherein:
the tightening comprises rotating an actuation member about an axis, said axis off normal to a central radial plane of the root by 5-30°.

8. The method of claim 7 further comprising:
loosening the second jaw by a reverse rotation about said axis.

9. The method of claim 4 further comprising:
loosening the second jaw by a reverse rotation about said axis.

10. The method of claim 1 wherein the fixture comprises:
said base having a mounting surface defining a mounting plane; and
a screw for securing the second jaw against the root, the screw having a screw axis 5-30° off parallel to the mounting plane, the tightening being a tightening of the screw.

11. The method of claim 10 wherein:
the tightening of the screw comprises rotating the screw about the screw axis relative to the second jaw.

12. The method of claim 11 wherein:
there is a single movable jaw being said second jaw.

13. The method of claim 1 wherein:
there is a single movable jaw being said second jaw.

14. The method of claim 13 wherein:
the tightening consists of tightening a screw to cause the second jaw to exert said downward force to the blade root.

* * * * *